US012576586B2

(12) United States Patent
Casey

(10) Patent No.: US 12,576,586 B2
(45) Date of Patent: Mar. 17, 2026

(54) FIBER REINFORCED PLASTIC DIGITAL LASER THREE-DIMENSIONAL PRINTING SYSTEM

(71) Applicant: Acelorex, Inc., Penfield, NY (US)

(72) Inventor: Brendan Casey, Webster, NY (US)

(73) Assignee: Acelorex, Inc., Penfield, NY (US)

( * ) Notice: Subject to any disclaimer, the term of this patent is extended or adjusted under 35 U.S.C. 154(b) by 286 days.

(21) Appl. No.: 18/233,167

(22) Filed: Aug. 11, 2023

(65) Prior Publication Data

US 2024/0116244 A1 Apr. 11, 2024

Related U.S. Application Data

(60) Provisional application No. 63/393,494, filed on Jul. 29, 2022.

(51) Int. Cl.

| | |
|---|---|
| *B29C 64/147* | (2017.01) |
| *B29C 35/08* | (2006.01) |
| *B29C 64/153* | (2017.01) |
| *B29C 64/188* | (2017.01) |
| *B29C 64/236* | (2017.01) |
| *B29C 64/245* | (2017.01) |
| *B29C 64/295* | (2017.01) |
| *B29C 64/35* | (2017.01) |
| *B33Y 10/00* | (2015.01) |
| *B33Y 30/00* | (2015.01) |
| *B33Y 40/20* | (2020.01) |
| *B33Y 80/00* | (2015.01) |

(52) U.S. Cl.
CPC ........ *B29C 64/245* (2017.08); *B29C 35/0805* (2013.01); *B29C 64/147* (2017.08); *B29C 64/153* (2017.08); *B29C 64/188* (2017.08); *B29C 64/236* (2017.08); *B29C 64/295*

(2017.08); *B29C 64/35* (2017.08); *B33Y 10/00* (2014.12); *B33Y 30/00* (2014.12); *B33Y 40/20* (2020.01); *B29C 2035/0827* (2013.01); *B29C 2791/009* (2013.01); *B29C 2793/0027* (2013.01); *B29C 2793/0081* (2013.01); *B29K 2313/00* (2013.01)

(58) Field of Classification Search
CPC ..................................................... B29C 64/147
See application file for complete search history.

(56) References Cited

U.S. PATENT DOCUMENTS

| | | | | |
|---|---|---|---|---|
| 9,827,754 B2 * | 11/2017 | Swartz | ...................... | B32B 5/26 |
| 11,273,608 B2 * | 3/2022 | Rogren | .................. | B22F 12/88 |
| 11,724,464 B2 * | 8/2023 | Casey | .................. | B29C 66/729 |
| | | | | 428/57 |
| 2015/0030817 A1 * | 1/2015 | Wiegelmann | ............. | B44F 9/02 |
| | | | | 427/256 |

* cited by examiner

*Primary Examiner* — Atul P. Khare
(74) *Attorney, Agent, or Firm* — Michael J. Nickerson

(57) ABSTRACT

A method for creating three-dimensional object and a three-dimensional printing system (a) provide a substrate; (b) provide construction material to coat the substrate; (c) curie a portion of the construction material on the substrate to create an object on the substrate; (d) remove excess construction material from the substrate; (e) cut an outline around the object created on the substrate; (f) repeating (a)-(e) until a desired number of substrates with an object created thereon have been processed; (g) stack the processed substrates; and (h) finish the stacked processed substrates to bond the stacked processed substrates together.

20 Claims, 10 Drawing Sheets

FIBER REINFORCED PLASTIC DIGITAL LASER THREE-DIMENSIONAL PRINTING SYSTEM

PRIORITY INFORMATION

The present application claims priority, under 35 U.S.C. § 119(e), from U.S. Provisional Patent Application, Ser. No. 63/393,494, filed on Jul. 29, 2022. The entire content of U.S. Provisional Patent Application, Ser. No. 63/393,494, filed on Jul. 29, 2022, is hereby incorporated by reference.

BACKGROUND

There are numerous methods for three-dimensional printing. Each has its own strengths and weaknesses.

For example, Fused Deposition Modeling (FDM) uses filaments. Fused deposition modeling fuses a filament together to build a three-dimensional object. This process can be very inexpensive, but it is slow with low resolution. Moreover, the resulting object has generally weak material strength and properties.

Another example is stereolithography. Stereolithography uses lasers and a photosensitive liquid to produce three-dimensional parts. This process can have good resolution and reasonable costs, but the material properties are limited by the photosensitive materials.

Digital Light Processing is another example. Digital light processing uses lasers and a photosensitive liquid to produce three-dimensional parts. This process can have good resolution and reasonable costs, but the material properties are limited by the photosensitive materials.

Other examples, inkjet and multi-jet printing use inkjet heads and UV curing inks to produce three-dimensional parts. The machines can be reasonably priced, can do color, and have a small variety of ink materials. However, inkjet and multi-jet printing are not able to cost effectively produce usable parts with the material properties needed for industry.

Conventionally, powder bed and inkjet have been used to produce in to produce color three-dimensional objects for decoration, but with weak material properties. Furthermore, the inkjet solutions are somewhat limited by resolution and by the inherent unreliability of inkjet.

Composite-Based Additive Manufacturing (CBAM) has the potential for strong parts due to the fiber reinforcements of the parts. However, composite-based additive manufacturing has the unreliability of inkjet.

Therefore, it is desirable to provide a three-dimensional printing system that is cost effective, reliable, and produces parts with the appropriate material strength.

It is further desirable to provide a three-dimensional printing system that combines the material properties of a number of thermoplastics and the reinforcement properties of various fibers.

It is also desirable to provide a three-dimensional printing system that combines the material properties of a number of thermoplastics and the reinforcement properties of various fibers with the resolution of laser imaging.

Additionally, it is desirable to provide a three-dimensional printing system that combines the material properties of a number of thermoplastics and the reinforcement properties of various fibers with the resolution and reliability of laser imaging.

BRIEF DESCRIPTION OF THE DRAWING

The drawings are only for purposes of illustrating various embodiments and are not to be construed as limiting, wherein.

DETAILED DESCRIPTION OF THE DRAWING

Figure 1:
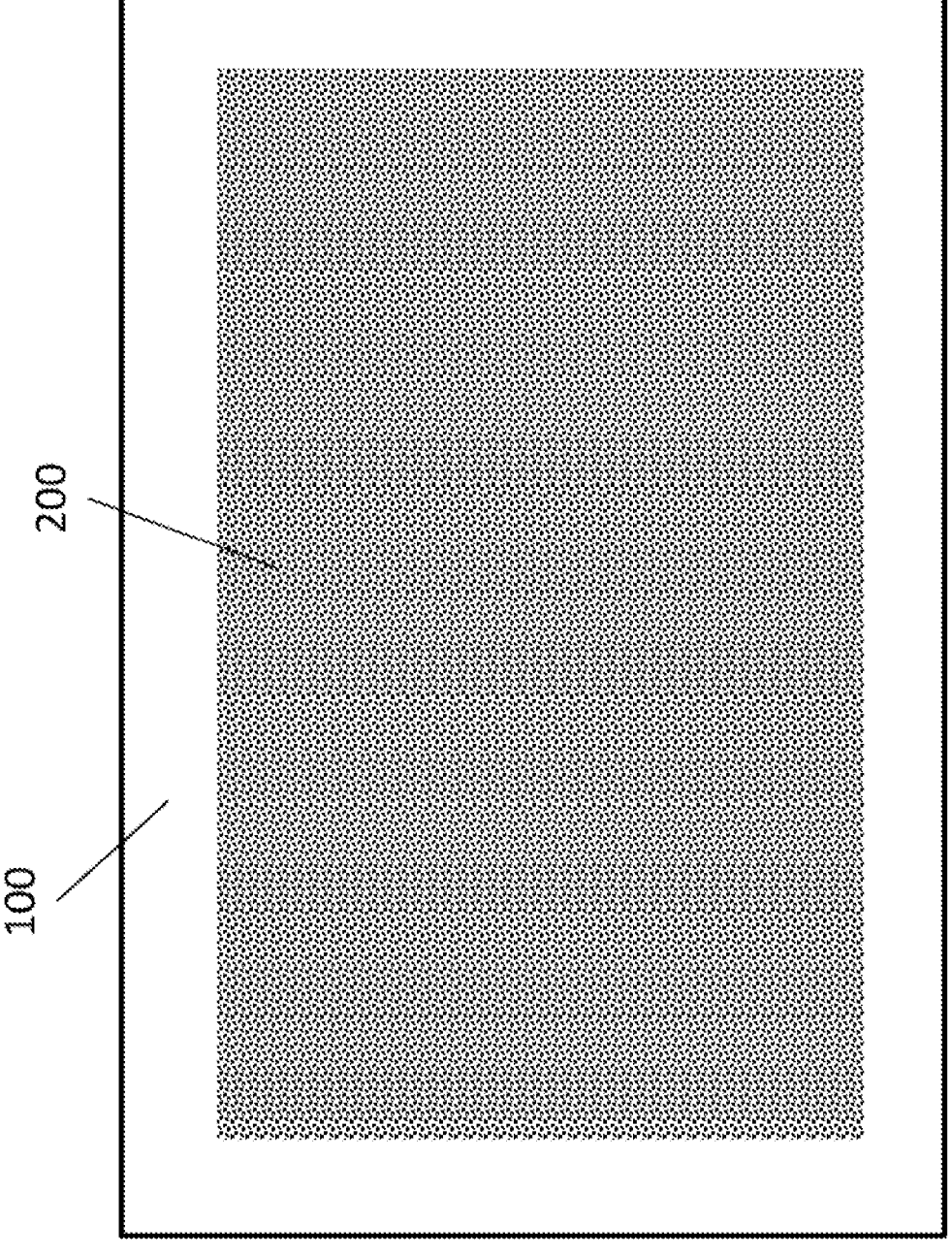
FIG. 1 illustrates a fiber substrate coated with plastic powder.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

FIG. 1 illustrates a fiber substrate coated with plastic powder. As illustrated in FIG. 1, a fiber substrate 100 is coated with plastic powder 200.

Figure 2:
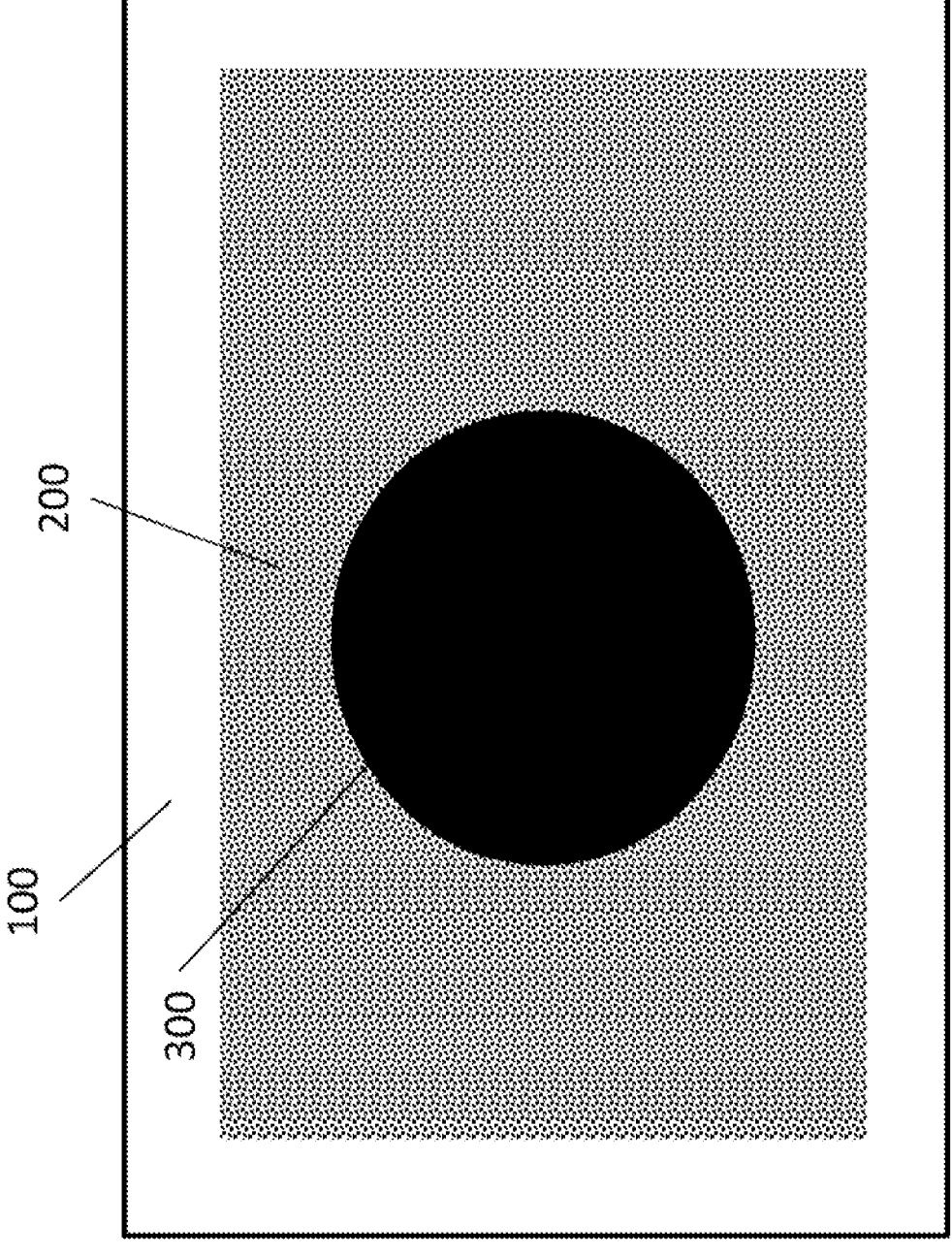
FIG. 2 illustrates the fiber substrate of FIG. 1 with a lasered object.

FIG. 2 illustrates the fiber substrate of FIG. 1 with a lasered object. As illustrated in FIG. 2, a predetermined area (300) of the plastic powder 200, on the fiber substrate 100, is imaged (scanned with a laser (not shown)) to create an object 300. The plastic powder 200 in the predetermined area (300) is melted into the fiber substrate 100 by the application of the laser (not shown).

Figure 3:
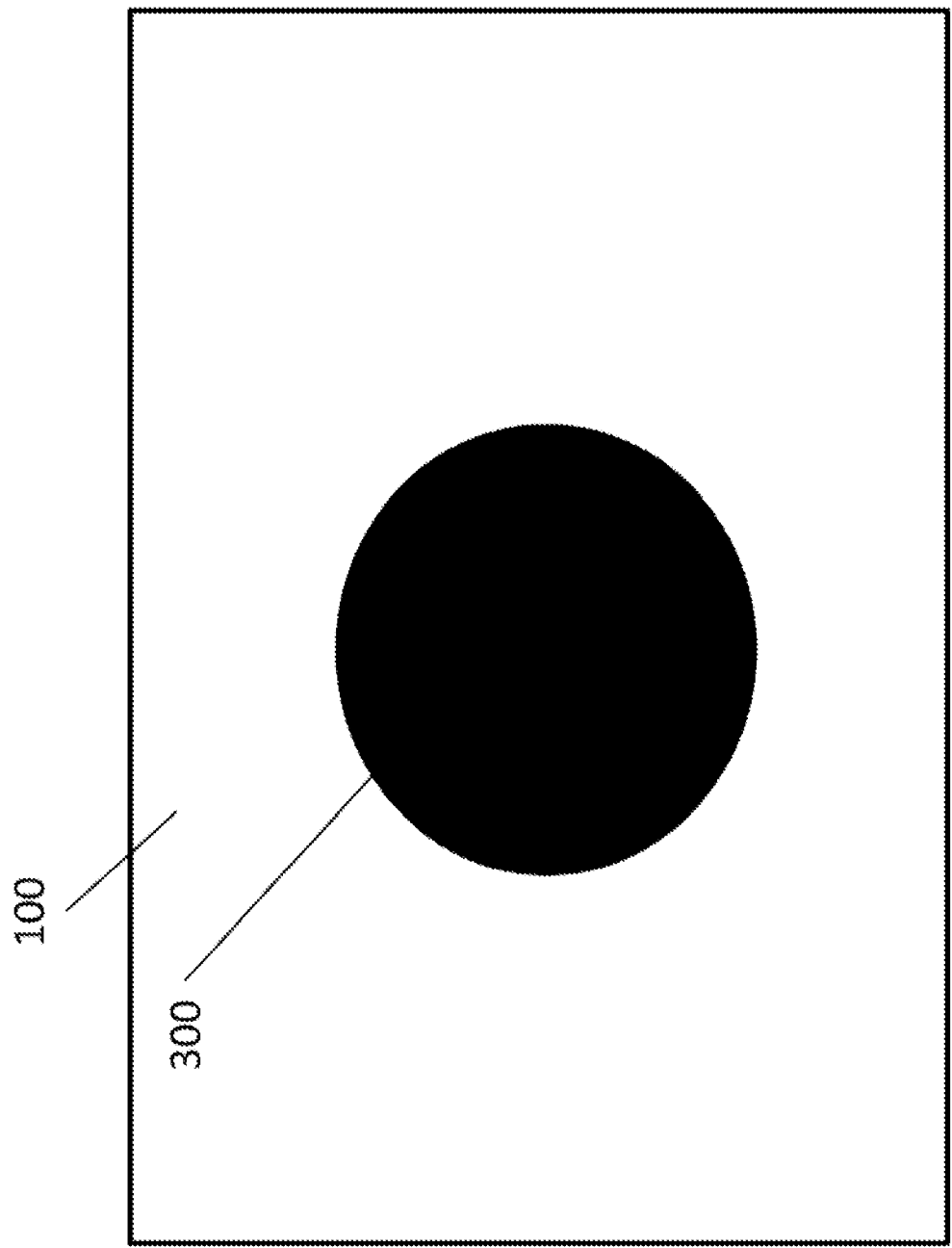
FIG. 3 illustrates the fiber substrate of FIG. 1 with a lasered object and the excess plastic powder removed.

FIG. 3 illustrates the fiber substrate of FIG. 1 with a lasered object and the excess plastic powder removed. As illustrated in FIG. 3, the excess plastic powder is removed by a vacuum (not shown), leaving the fiber substrate 100 with the object 300 thereon.

Figure 4:
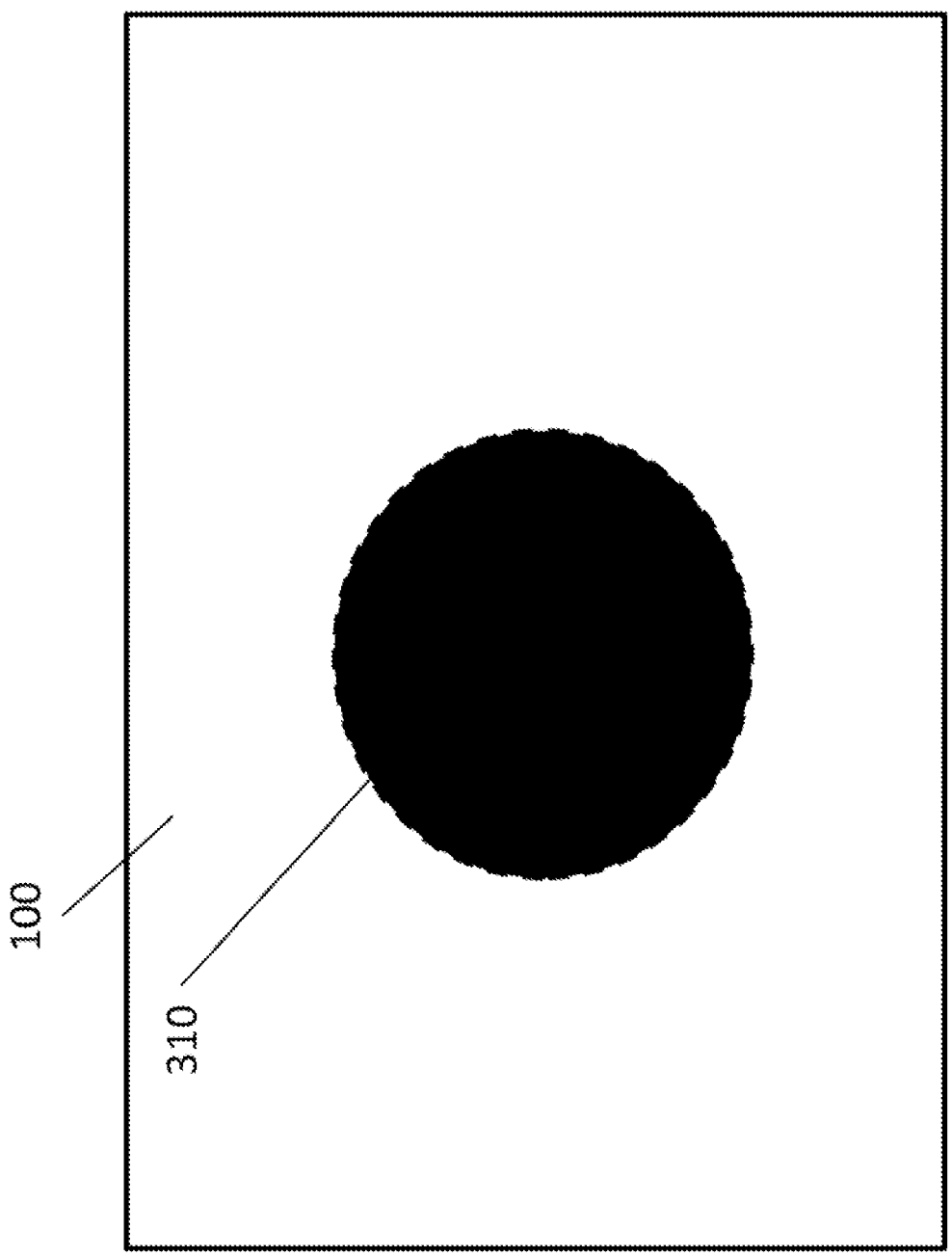
FIG. 4 illustrates the fiber substrate of FIG. 1 with a lasered object being cut.

FIG. 4 illustrates the fiber substrate of FIG. 1 with a lasered object being cut. As illustrated in FIG. 4, a laser (not shown) is used to cut the outline of the object 310 on the fiber substrate 100. The outline of the object 310 may be cut completely or cut in a perforated manner.

Figure 5:
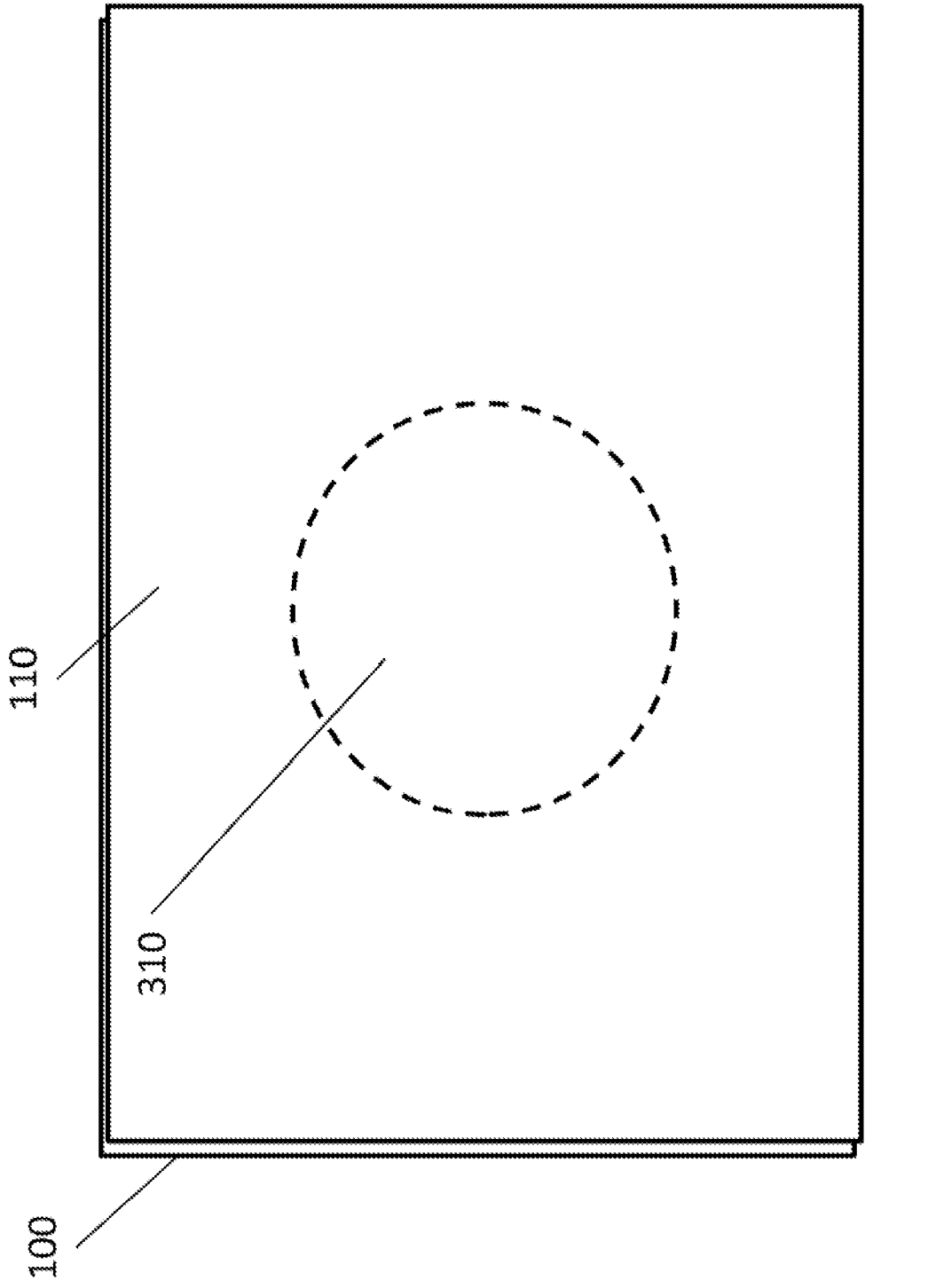
FIG. 5 illustrates another fiber substrate overlaying the fiber substrate of FIG. 4.

FIG. 5 illustrates another fiber substrate overlaying the fiber substrate of FIG. 4. As illustrated in FIG. 5, another fiber substrate 110 is overlaid onto the fiber substrate 100 having the object 310 thereon.

It is noted that the processes represented by FIGS. 1-5 are repeated until the object 310 is properly constructed.

Figure 6:
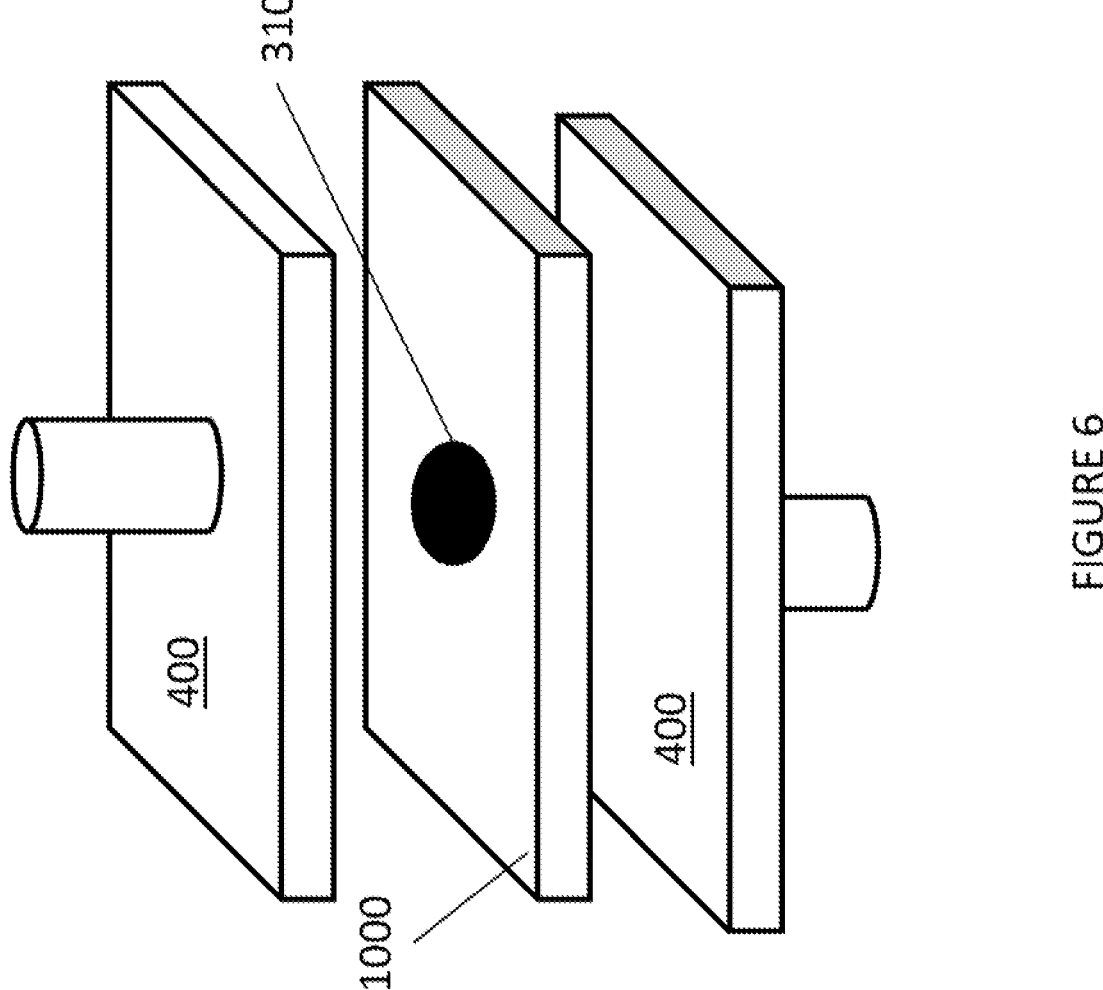
FIG. 6 illustrates the compressing of the fiber substrates.

FIG. 6 illustrates the compressing of the fiber substrates. As illustrated in FIG. 6, when the object 310 is properly constructed, the combined fiber substrates 1000 are compressed by pads 400.

It is noted that pads 400 may also apply heat to the combined fiber substrates 1000 during compression.

It is noted that pads 400 may apply heat to the combined fiber substrates 1000 without compression.

Figure 7:
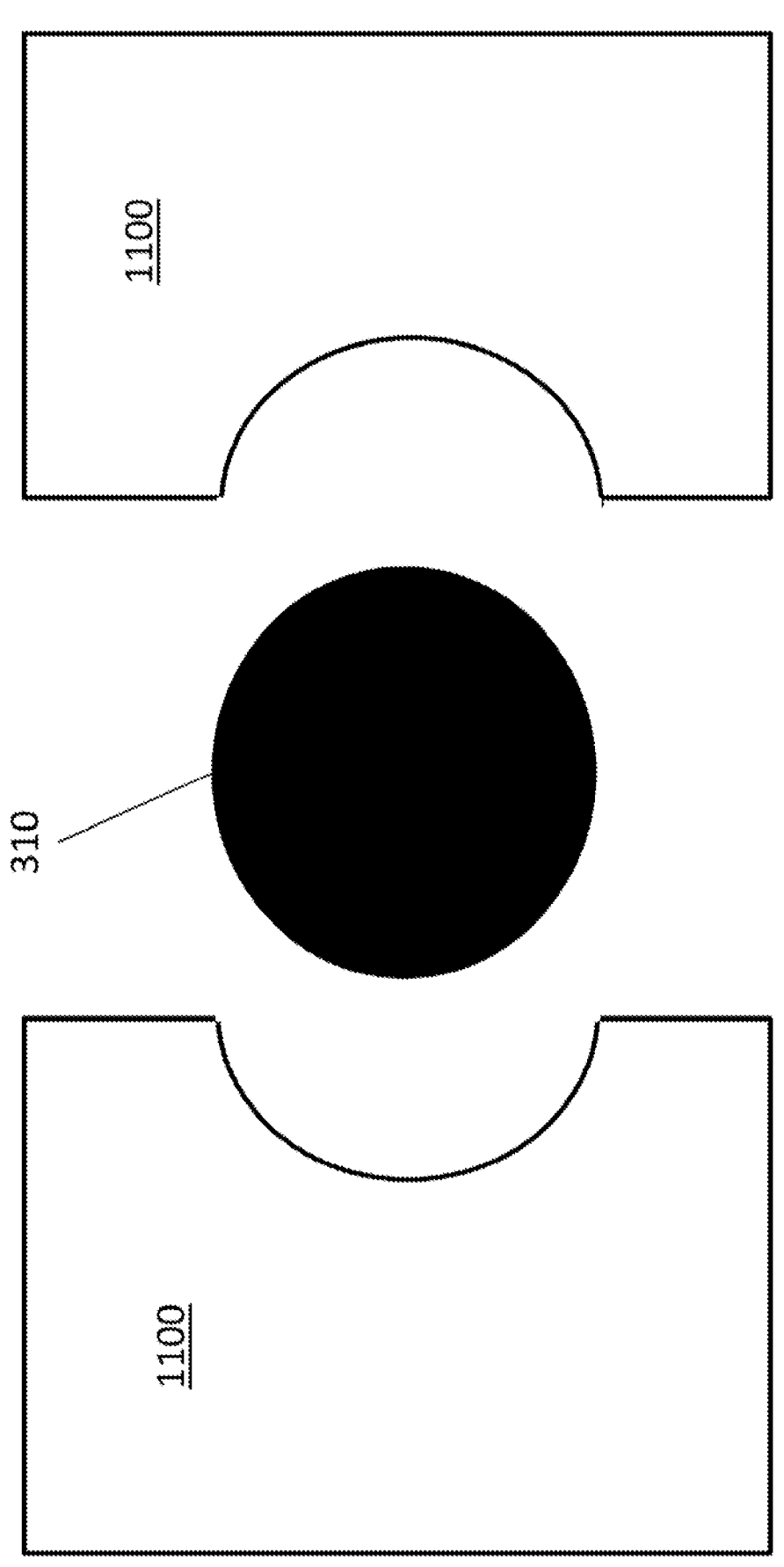
FIG. 7 illustrates the removal of excess fiber substrate from the object.

FIG. 7 illustrates the removal of excess fiber substrate from the object. As illustrated in FIG. 7, the excess combined fiber substrates 1100 is removed from the object 310.

Figure 8:
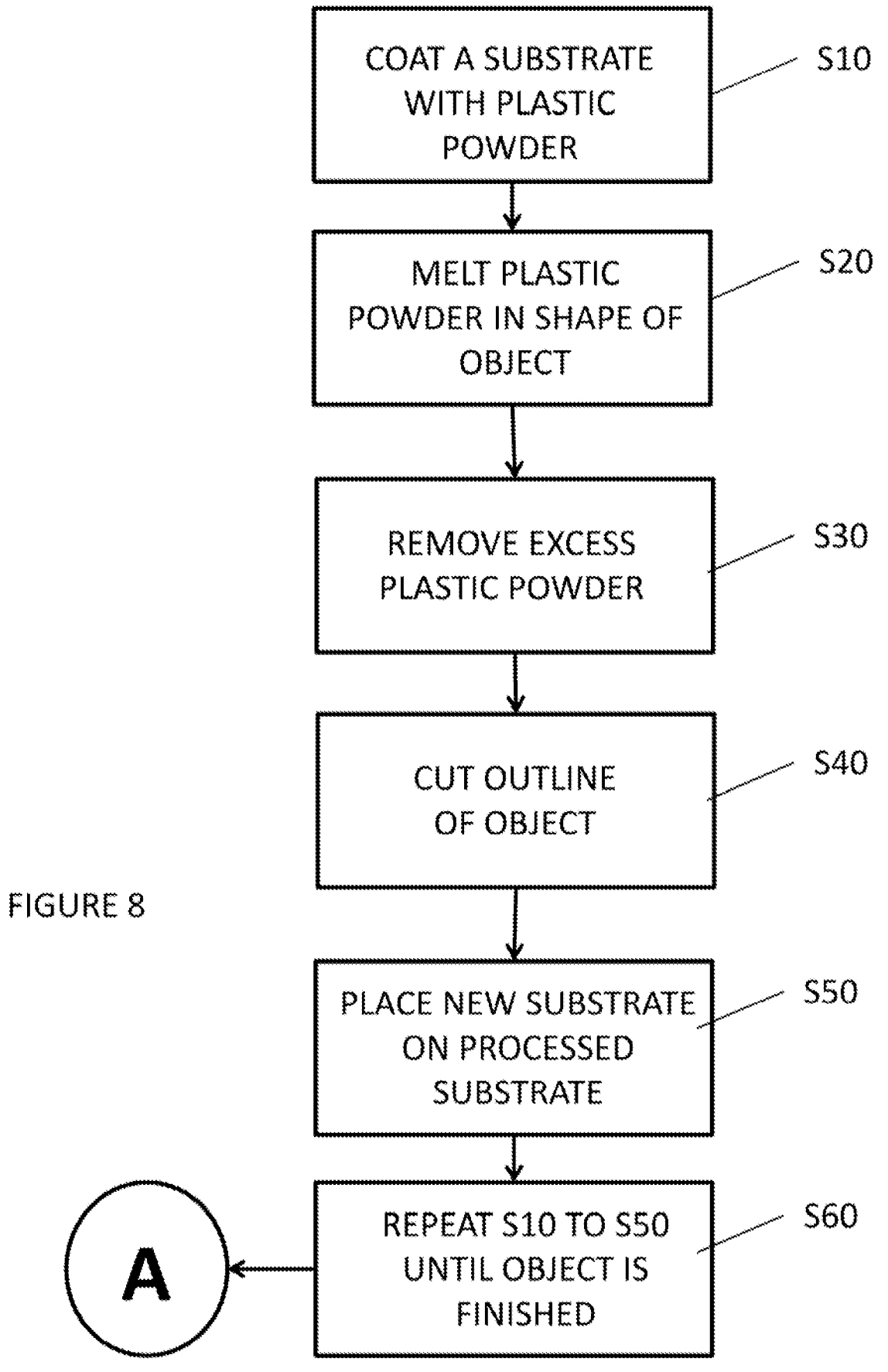
FIGS. 8 and 9 are flowcharts showing the three-dimensional printing process.

FIG. 8 is a flowchart showing a portion of the three-dimensional printing process. As illustrated in FIG. 8, at step S10, a fiber substrate is coated with plastic powder.

At step S20, a predetermined area of the plastic powder, on the fiber substrate, is imaged (scanned with a laser) to create an object. The plastic powder in the predetermined area is melted into the fiber substrate by the application of the laser.

At step S30, the non-melted (excess) plastic powder is removed from the fiber substrate, preferably by a vacuum.

At step S40, a laser is used to cut the outline of the object on the fiber substrate. The outline of the object may be cut completely or cut in a perforated manner.

At Step S50, another fiber substrate is overlaid onto the fiber substrate having the object thereon, to create combined fiber substrates.

At Step S60, steps S10 to S50 are repeated until the object is properly constructed. When the object is properly constructed, through the combined fiber substrates, the process proceeds to step S70 of FIG. 8.

Figure 9:
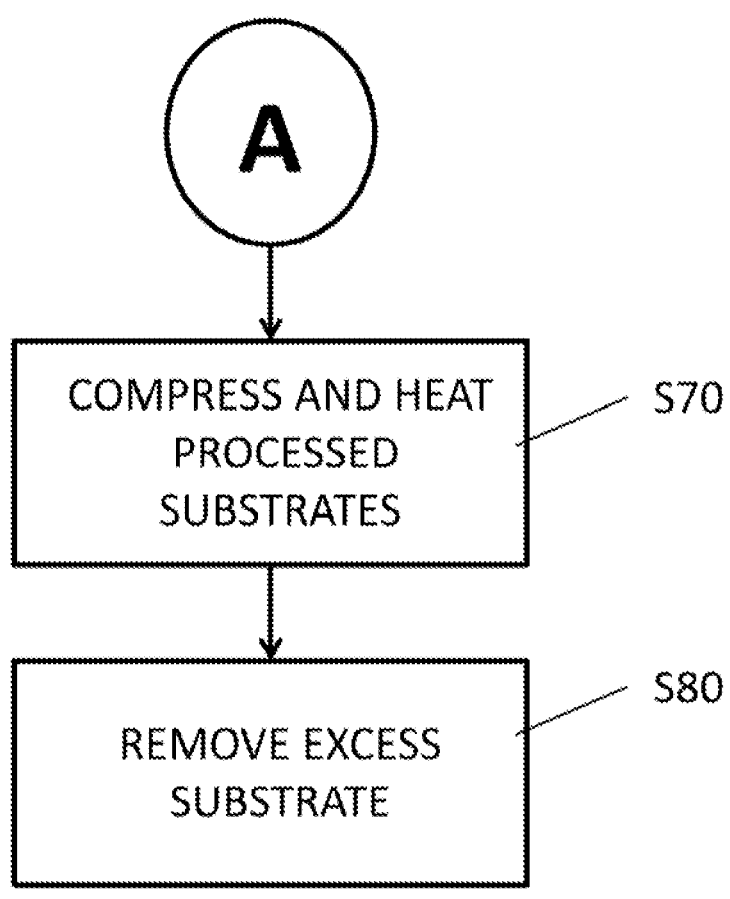

FIG. 9 is a flowchart showing a portion of the three-dimensional printing process. As illustrated in FIG. 9, at step S70, the combined fiber substrates are compressed. After step S70, the excess fiber substrate is removed, at step S80, along the laser cut outline.

Figure 10:
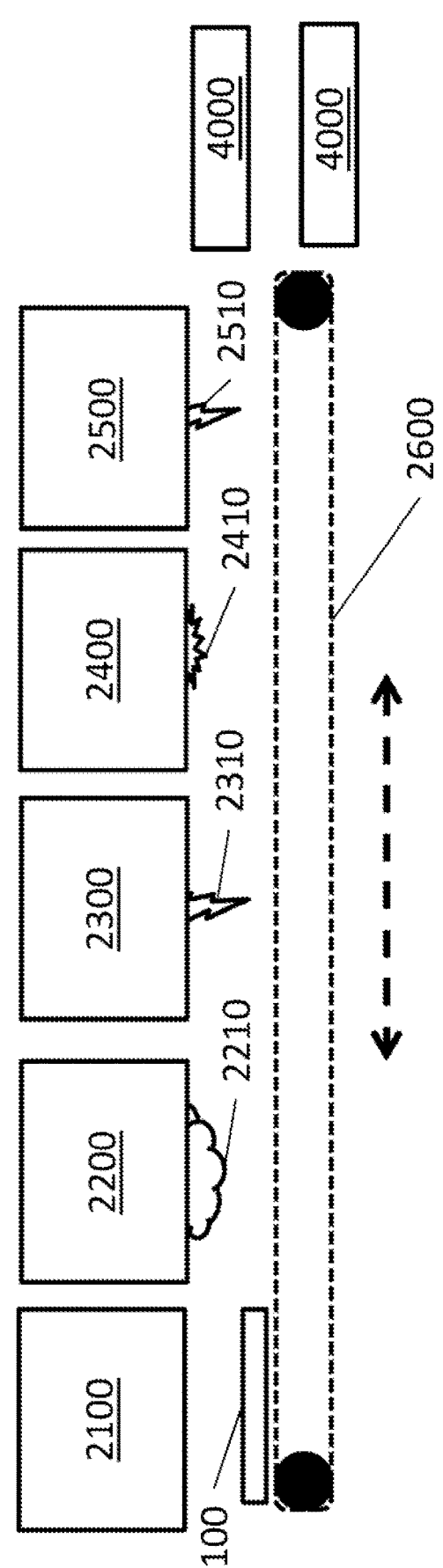
FIG. 10 is a block diagram illustrating a three-dimensional printing system for creating a three-dimensional object using a substrate and light-curable construction powder.

FIG. 10 a block diagram illustrating a three-dimensional printing system for creating a three-dimensional object using layers of a substrate and light-curable construction powder. As illustrated in FIG. 10, the three-dimensional printing system 2000 includes a substrate station 2100, which provides a substrate 100, preferably a fiber substrate. The three-dimensional printing system 2000 includes a construction material station 2200, which provides construction material 2210 to coat the substrate 100. The substrate 100 may be transported, as illustrated, by conveyor 2600 from the substrate station 2100 to the construction material station 2200.

The construction material 2210 is preferably a powder. The construction material 2210 may be a plastic powder. Moreover, the construction material 2210 may be a light curable material. Furthermore, the construction material 2210 may be a light curable plastic powder.

As illustrated in FIG. 10, the three-dimensional printing system 2000 includes a curing station 2300 for curing a portion of the construction material 2210 on the substrate 100. The curing station 2300 may cure, as illustrated, portion of the construction material 2210 on the substrate 100 using a laser 2310. The substrate 100 may be transported, as illustrated, by conveyor 2600 from the construction material station 2200 to the curing station 2300.

More specifically, as illustrated, a predetermined area of the construction material 2210 on the substrate 100, is imaged (scanned with laser 2310) to create an object. In one embodiment, the construction material 2210 in the predetermined area is melted into the substrate 100 by the application of the laser 2310.

As illustrated in FIG. 10, the three-dimensional printing system 2000 includes a cleaning station 2400 to remove excess construction material 2210 from the substrate 100. As illustrated, the excess construction material 2210 is removed by a vacuum 2410, leaving the substrate 100 with the object thereon. The substrate 100 may be transported, as illustrated, by conveyor 2600 from the curing station 2300 to the cleaning station 2400.

As illustrated in FIG. 10, the three-dimensional printing system 2000 includes a cutting station 2500 for cutting an outline around the object on the substrate 100. The cutting station 2500, as illustrated, uses a laser 2510 used to cut the outline of the object on the substrate 100. The outline of the object may be cut completely or cut in a perforated manner. The substrate 100 may be transported, as illustrated, by conveyor 2600 from the cleaning station 2400 to the cutting station 2500.

The substrate 100 may be transported back to substrate station 2100, via conveyor 2600, wherein another substrate can be placed upon (overlaid onto) the substrate 100 and the above described process can be repeated with respect to the new substrate to create a next layer of the object to be constructed. When all the desired layers are processed, the layered substrates are transported, by the conveyor 2600, to a finishing station 4000.

Alternatively, the conveyor 2600 may transport the substrate 100 to the finishing station 4000, wherein the other substrates are processed in an assembly-line fashion and deposited on top of (overlaid onto) substrate 100 in the finishing station 4000.

When the object is properly constructed (all the desired layers are processed), the combined substrates may be compressed by pads in the finishing station 4000. It is noted that the finishing station 4000 may also apply heat to the combined substrates during compression. It is also noted that the finishing station 4000 may apply heat to the combined substrates without compression.

Upon exiting the finishing station 4000, excess substrate can be removed (not shown) from the object.

Although FIG. 10 illustrates the use of a conveyor system to transport the substrates between stations, any transport system can be used; i.e., the substrates could be on a carrousel system that transports the substrates to each station.

Additionally, although FIG. 10 illustrates the use of a conveyor system to transport the substrates between stations, the substrates can remain stationary and the stations are transported to the substrates; i.e., a carrousel system that transports the stations to the substrates.

It is also noted that although FIG. 10 illustrates that the curing station is separate from the cutting station, these stations can be a single station using a laser to cure and then using the laser to cut.

Although FIG. 10 illustrates that the curing station is laser driven, the curing station may be a UV light source for curing UV-curable construction material.

Although FIG. 10 illustrates that the curing station is laser driven, the curing station may be a heat source for curing heat curable construction material.

In summary, a three-dimensional file of an object to be constructed is sliced into layers and the layer files are presented to the three-dimensional printing machine. For each layer, the following process is used.

A sheet of substrate is laid down. The substrate can be woven or nonwoven fiber, such as carbon fiber or fiberglass but can also be any number of other materials, including more traditional fabrics.

A powder material is spread over the substrate by any conventional method. The powder can be nylon, plastic, or other plastic like materials. The melting point of the powder material should be below the melting point of the substrate.

A laser selectively melts the powder material consistent with the slice of the part that is being imaged. The laser can be a scanning laser or a laser array or other such methodology to produce the image of the slice.

By adjusting the laser parameters such as power, speed, focus, etc., the laser can melt the powder material into the substrate or tack it to the surface as is desired. In other words, the substrate could be saturated with the powder material or lightly coated as desired.

The unmelted powder material is removed from the substrate by a vacuum, blowing, gravity, or any other such method.

The outline of the part can be cut to make the final processing of the part easier. This cutting can be done after the removal of the unmelted powder material or before the removal unmelted powder material.

The cutting can be a dotted line or dashed line or other such perforated pattern as to let the substrate and the printed object to hold together for downstream processing or the laser can completely cut out the object.

It is noted that various guide holes may be cut by the laser into the substrate to assist post processing.

A new substrate is overlaid the processed substrate and the above processes are repeated to build the object. By building the object this way (layer by layer), each layer on top of itself, the layer to layer variation will be reduced vs printing layers separately and then stacking the layers.

However, it is note that each layer can be imaged separately and stacked in a separate operation.

When the object is completed, the build block of many combined substrate layers can be put under pressure to compress the layers and complete the binding of the layers. This can improve the material properties of the part.

It is noted that the combined fiber substrates may be heated during compression.

It is noted that the combined fiber substrates may be heated without compression.

The excess substrate is removed. Depending on the part and the use of the laser cutting described above this may be as simple as pulling the unused pieces off. In some cases, after pulling the easily removed pieces off, there may need to be other methods used, ranging from brushing to sandblasting or other types of approaches to remove the excess substrate.

A three-dimensional printing system, comprises a substrate source configured to provides a substrate; a construction material station configured to provide construction material to coat the substrate; a curing station configured to cure a portion of the construction material on the substrate to create an object on the substrate; a cleaning station configured to remove excess construction material from the substrate; a cutting station configured to cut an outline around the object created on the substrate; and a finishing station configured to bond multiple substrates together.

The finishing station may be configured to apply compression to multiple substrates bond multiple substrates together.

The finishing station may be configured to apply heat to multiple substrates bond multiple substrates together.

The substrate may be a fiber substrate.

The construction material may be a light curable construction material.

The construction material may be a light curable plastic powder.

The curing station may include a laser to cure the portion of the construction material on the substrate to create the object on the substrate.

The cutting station may include a laser to cut the outline around the object created on the substrate.

The he curing station may include a UV light source to cure the portion of the construction material on the substrate to create the object on the substrate.

A method for creating three-dimensional object using a three-dimensional printing system, comprises (a) providing a substrate; (b) providing construction material to coat the substrate; (c) curing a portion of the construction material on the substrate to create an object on the substrate; (d) removing excess construction material from the substrate; (e) cutting an outline around the object created on the substrate; (f) repeating steps (a)-(e) until a desired number of substrates with an object created thereon have been processed; (g) stacking the processed substrates; and (h) finishing the stacked processed substrates to bond the stacked processed substrates together.

The finishing may apply compression to the stacked processed substrates to bond the stacked processed substrates together.

The finishing may apply heat to the stacked processed substrates to bond the stacked processed substrates together.

The finishing station may be configured to apply heat to multiple substrates bond multiple substrates together.

The substrate may be a fiber substrate.

The construction material may be a light curable construction material.

The construction material may be a light curable plastic powder.

The curing may use a laser to cure the portion of the construction material on the substrate to create the object on the substrate.

The cutting may use a laser to cut the outline around the object created on the substrate.

The curing may use a UV light source to cure the portion of the construction material on the substrate to create the object on the substrate.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above.

What is claimed is:

1. A three-dimensional printing system for creating a three-dimensional object, the system comprising:
    a substrate source configured to provide a substrate;
    a construction material station configured to provide construction material to coat said substrate;
    a curing station configured to cure a portion of said construction material on said substrate to create an object on said substrate;
    a cleaning station configured to remove an excess of the construction material from said substrate; and
    a cutting station configured to cut an outline around the object created on said substrate, wherein said substrate is one of multiple substrates provided by said substrate source and individually transported by a conveyor through the construction material station, the curing station, the cleaning station, and the cutting station, and wherein the system further comprises:
    a finishing station configured to bond said multiple substrates together to create the three-dimensional object.

2. The three-dimensional printing system, as claimed in claim 1, wherein said finishing station is configured to apply compression to said multiple substrates to bond said multiple substrates together.

3. The three-dimensional printing system, as claimed in claim 1, wherein said finishing station is configured to apply heat to said multiple substrates to bond said multiple substrates together.

4. The three-dimensional printing system, as claimed in claim 1, wherein said substrate is a fiber substrate.

5. The three-dimensional printing system, as claimed in claim 1, wherein said construction material is a light curable construction material.

6. The three-dimensional printing system, as claimed in claim 1, wherein said construction material is a light curable plastic powder.

7. The three-dimensional printing system, as claimed in claim 4, wherein said construction material is a light curable plastic powder.

8. The three-dimensional printing system, as claimed in claim 1, wherein said curing station includes a laser to cure said portion of said construction material on said substrate to create the object on said substrate.

9. The three-dimensional printing system, as claimed in claim 1, wherein said cutting station includes a laser to cut the outline around the object created on said substrate.

10. The three-dimensional printing system, as claimed in claim 1, wherein said curing station includes a UV light source to cure said portion of said construction material on said substrate to create the object on said substrate.

11. A method for creating three-dimensional object using a three-dimensional printing system, comprising:

(a) providing a substrate;

(b) providing construction material to coat the substrate;

(c) curing a portion of the construction material on the substrate to create an object on the substrate;

(d) removing an excess of construction material from the substrate; and (e) cutting an outline around the object created on the substrate, wherein the substrate is one of a desired number of substrates, and wherein the method further comprises;

(f) repeating steps (a)-(e) for each of the desired number of substrates;

(g) stacking the desired number of the substrates; and (h) finishing the stacked substrates so as to bond the stacked substrates together and thereby create the three-dimensional object.

12. The method, as claimed in claim 11, wherein said step (h) of finishing applies compression to the stacked substrates to bond the stacked substrates together.

13. The method, as claimed in claim 11, wherein said step (h) of finishing applies heat to the stacked substrates to bond the stacked substrates together.

14. The method, as claimed in claim 11, wherein each of the substrates is a fiber substrate.

15. The method, as claimed in claim 11, wherein the construction material is a light curable construction material.

16. The method, as claimed in claim 11, wherein the construction material is a light curable plastic powder.

17. The method, as claimed in claim 14, wherein the construction material is a light curable plastic powder.

18. The method, as claimed in claim 11, wherein said step (c) of curing uses a laser to cure the portion of the construction material on the substrate to create the object on the substrate.

19. The method stem, as claimed in claim 11, wherein said step (e) of cutting uses a laser to cut the outline around the object created on the substrate.

20. The method, as claimed in claim 11, wherein said step (c) of curing uses a UV light source to cure the portion of the construction material on the substrate to create the object on the substrate.

* * * * *